No. 864,912.  
PATENTED SEPT. 3, 1907.
H. PADLEY.  
JOINTED TROLLEY POLE.  
APPLICATION FILED JUNE 1, 1906.
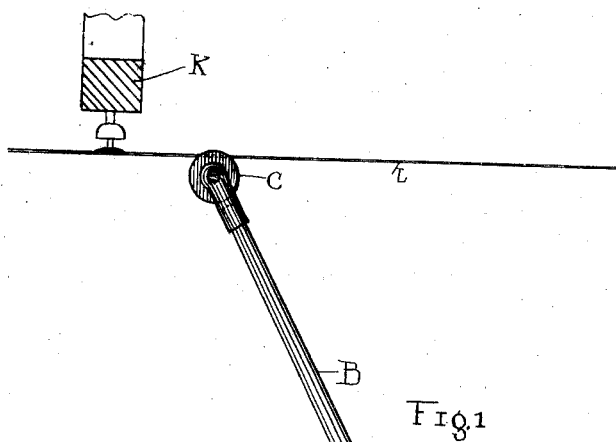
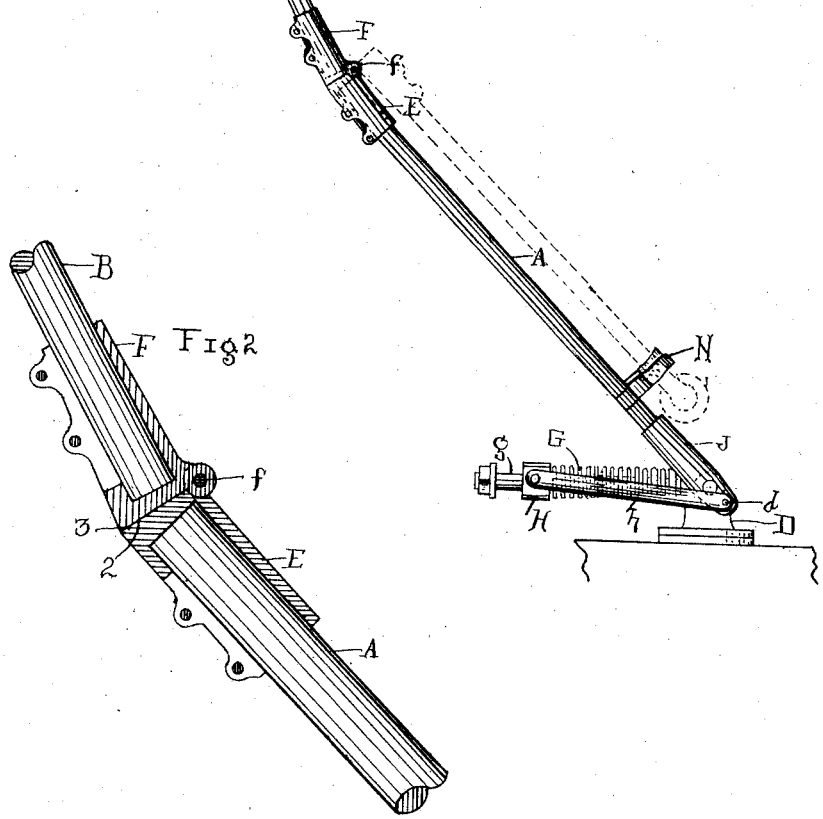
WITNESSES:  
E. M. Fisher  
C. A. Bell
INVENTOR.  
Harry Padley  
BY  
H. J. Fisher  
ATTORNEY.

UNITED STATES PATENT OFFICE.

HARRY PADLEY, OF ELYRIA, OHIO.

JOINTED TROLLEY-POLE.

No. 864,912.　　　Specification of Letters Patent.　　　Patented Sept. 3, 1907.

Application filed June 1, 1906. Serial No. 319,727.

*To all whom it may concern:*

Be it known that I, HARRY PADLEY, a citizen of the United States, residing at Elyria, in the county of Lorain and State of Ohio, have invented certain new and useful Improvements in Jointed Trolley-Poles, and do declare that the following is a full, clear, and exact description of the invention, which will enable others skilled in the art to which it appertains to make and use the same.

My invention relates to improvements in jointed trolley poles, and the invention consists in a trolley pole adapted especially to be used for backing up purposes, so that when a car is backed and the trolley wheel leaves the wire and strikes an obstruction it will flex or bend downward at the joint and not be injured, all substantially as shown and described and particularly pointed out in the claims.

In the accompanying drawings Figure 1 is a side elevation of the trolley pole embodying my invention and shown as in working position, and Fig. 2 is an enlarged longitudinal sectional elevation of the joint or hinge portion of the pole.

As thus shown A represents the lower or controlling section or part of the pole and B the upper section or part thereof, carrying wheel C.

D is the usual rotary base and E and F, respectively, represent the socket-joint or hinge members of the pole.

G is a spring which encircles a rod $g$ projecting laterally from the base and is controlled by a head H on said rod which is engaged by links $h$ with the lower terminal socket member J of the pole beneath its pivot on base D and connected with said socket member at $d$. The said spring is of such strength as to exert the necessary tension to hold the trolley pole against wire L and keep it to work, but it also affords room for the pole to bend when it strikes an obstruction, such, for example, as cross beam K, from which the wire L is supported. When this occurs spring G is brought into action through links $h$ and head H, and the spring is more or less contracted according as the pole is bent more or less. If bent its full capacity the upper section B will simply be thrown down onto the lower section A, dotted lines, and no harm comes of the action. Thus, it will be seen that the hinge socket members E and F are pivoted at $b$ on the upper or inner side of said members, and out of direct alinement of either section of the pole.

It will be further observed that the said hinge socket members E and F are constructed with abutting shoulders 2 and 3, respectively, which are at an inclination to a right angle across the section to which they are affixed, so that practically the upper member B is projected at a decided angle to member A, and in such relation thereto that when the upper end of section B strikes cross beam K in backing it will not jam back on section A but the strain will be accommodated by a downward flex or bend at the elbow hinge. This construction really shortens the pole on its inner side relatively as shown and throws the elbow back and down far enough to cause all direct strain against the upper section, as in backing against an obstruction into the elbow where it is accommodated without injury to any part of the pole. The worst that can happen is to throw top section B back upon section A, as in dotted lines, into the spring fork N, fixed on the lower section of the pole and which catches the upper section without injury.

Usually in places where this style of pole is used there are two wires and two poles, so that one forms the return for the current.

What I claim is:—

1. A trolley pole having a hinge substantially at its middle and the hinge members thereof constructed each with an abutting face at an inclination to a right angle across the section to which it is attached, and the said members hinged at their inner edges where the pole is shortest.

2. A trolley pole consisting of two parts hinged together end to end, said hinge being at the inner side of said pole and a shoulder between said parts outside said hinge adapted to hold the upper part of the pole inward from a straight alinement with the lower part, whereby when the pole backs against an obstruction the hinge will make accommodation and prevent breakage.

3. A sectional trolley pole having hinge portions with transversely inclined abutting faces and the hinge at the inner edges of said face outside the plane of the pole, in combination with a base and spring mechanism thereon engaging the lower pole section and arranged to hold the pole up in working position.

4. A trolley pole comprising two sections hinged together end to end and having unobstructed abutting faces on the line of said hinge constructed to throw the inner section inward from a straight line with the outer section and located at the immediate ends of said sections, in combination with spring pressed mechanism engaging the lower end of the lower of said sections adapted to hold the pole in working position.

5. A two part trolley pole having one part abutting the other and a hinge connecting said parts, said hinge constructed to permit swinging of the upper part inward and downward upon the lower part, and a spring fixed on said lower part to catch and hold the upper part when the pole collapses.

In testimony whereof I sign this specification in the presence of two witnesses.

HARRY PADLEY.

Witnesses:
　C. A. SELL,
　E. M. FISHER.